Aug. 28, 1934. C. A. LAEMMEL 1,971,491
MEAT CHOPPING MACHINE
Filed Feb. 11, 1933
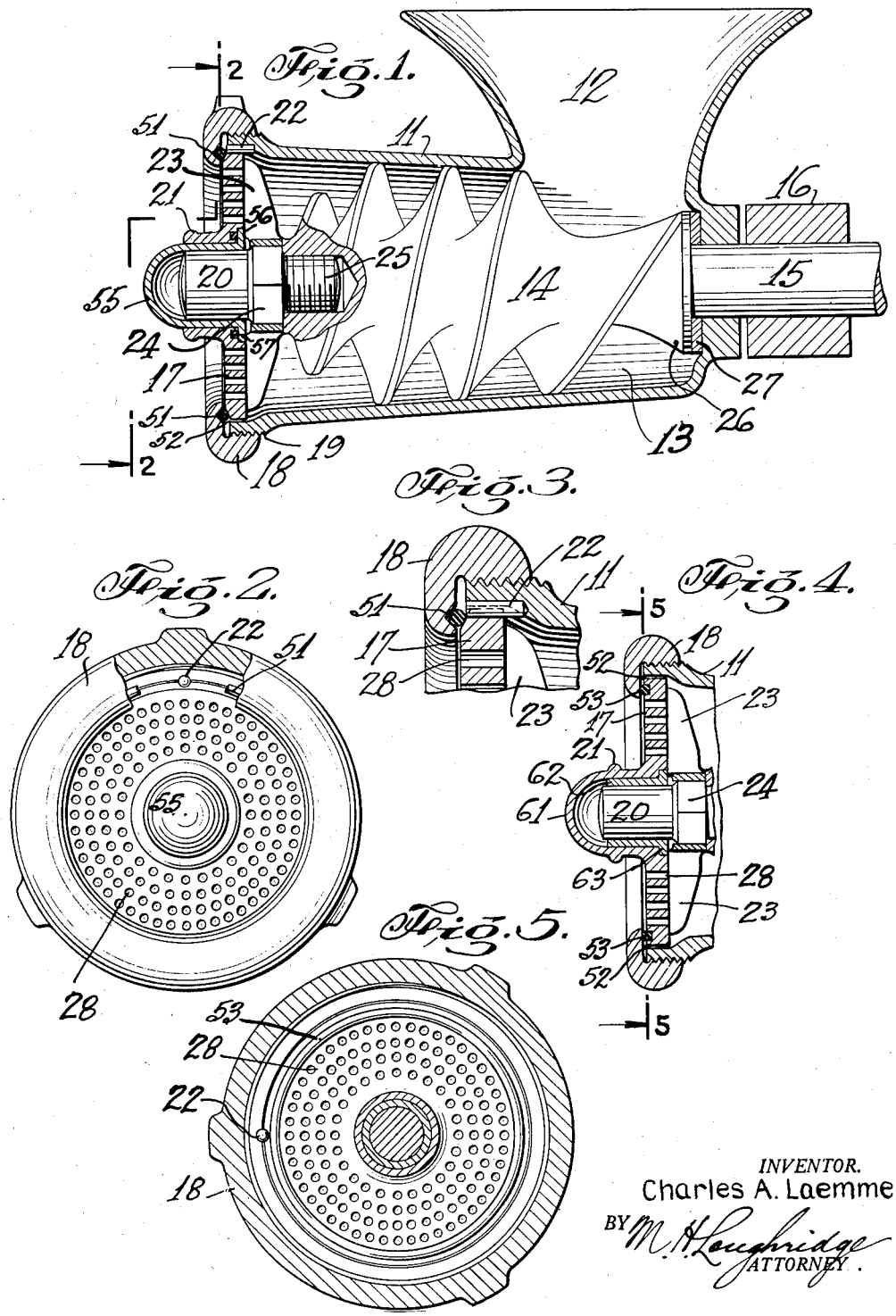
INVENTOR.
Charles A. Laemmel
BY M. H. Loughridge
ATTORNEY.

Patented Aug. 28, 1934

1,971,491

UNITED STATES PATENT OFFICE 1,971,491

MEAT CHOPPING MACHINE

Charles A. Laemmel, Brooklyn, N. Y., assignor to Atlantic Service Company, Inc., Brooklyn, N. Y., a corporation of New York Application February 11, 1933, Serial No. 656,214

3 Claims. (Cl. 146—189)

This invention relates to meat grinders and particularly to the end or die plate by which the meat is masticated. An object of the invention is to provide a sealed construction whereby the meat can only pass through the apertures of the die plate and cannot pass through the bearing or through the clearance between the die plate and the body of the device. Another object of the invention is to provide a closed bearing sleeve in the end plate for the working part of the device.

Other objects of the invention will appear from the following specification and the accompanying drawing, in which, Fig. 1 is a sectional, side elevation of a meat chopping machine having an end plate embodying my invention; Fig. 2 is a view on line 2—2 of Fig. 1; Fig. 3 is a detail, in section, showing the construction of the clamp and seal for the end plate; Fig. 4 is a sectional elevation of the end plate, clamp and bearing showing a modified construction, and Fig. 5 is a front elevation on line 5—5 of Fig. 4.

The commercial type of meat grinder to which this invention is applied comprises a cylindrical body with a hopper at one end and with a feed screw therein which feeds the meat from the hopper to the delivery end. At this end a die plate is provided with rows of perforations and with a cutter rotating against the inner face of this plate. A bearing is provided in the die plate for the feed screw and by a clamping attachment, the die plate and parts are readily removed for cleaning purposes. A meat grinder of this type is shown in U. S. Patent 1,690,904, Nov. 6, 1926 and may be built for operation either by hand or by power.

In the operation of machines of this type, the feed screw forces the meat against the die plate with considerable pressure with the result that portions of the meat are forced through the bearing, which is comparatively loose, also through the clearance between the end plate and the body of the device. The meat that is thus delivered is liable to be discolored and when mixed with the other meat, makes it unsatisfactory and unusable for many purposes.

In the present invention, the end or die plate is sealed in place and the central bearing is provided with a closed end to prevent escape of the meat except through the holes of the die plate, at the same time, the device is readily assembled and disassembled for sanitary reasons.

In the drawing, 11 is the body of the grinder, having the hopper 12 through which the meat to be ground is fed to the machine and forming the cylinder 13 in which the feed screw 14 is located. This screw has an operating shaft 15 mounted in the bearing 16 and is provided with a screw stud 25 at the outer end, having the square collar 24 upon which the cutter 23 is mounted and terminating in the bearing stud 20.

The end of the cylinder 13 is enclosed by the die plate 17, which is perforated with rows of perforations as indicated at 28 and against the inner face of which the blades of the cutter 23 engage. The end plate is clamped in place by the clamping nut 18, screwed to the body at 19, the inward thrust of the end plate being taken up by the cutter 23, the screw 14, collar 26 thereof and the thrust bearing 27; the engagement between the plate 17 and the cutter 23 is thus adjusted by the clamping nut 18.

The end plate is a comparatively loose fit in the body and is provided with a locking pin 22 which prevents its rotation relative to the body. A bearing is provided in the centre of the end plate for the screw 14. This bearing comprises the hub 21 which is preferably provided with a bearing sleeve 55, Fig. 1. This sleeve is flanged at the inner end as indicated at 56 and is provided with a closed outer end, indicated as dome shaped on the drawing. The bearing stud 20 works in this sleeve and holds the screw 14 in alignment. It will be noted that the flange 56 of the sleeve bearing is flush with the inner face of the end plate and is engaged by the cutter 23, thereby holding the bearing in place.

If desired, a gasket 57 may be provided below the flange 56 of the sleeve to insure a non-leaking fit between the bearing and the end plate. The end plate is assembled with a gasket 51 fitting a V-groove between the clamping nut 18 and the plate so that any meat forced through the opening 52 will engage the gasket and form a tight seal between the nut and the plate. In this construction the end bearing of the feed screw is closed and the end plate is sealed to the body so that the meat cannot escape from the cylinder 13 except by the apertures of the die plate where it is subject to the action of the cutter 23.

In the modification in Fig. 4, the gasket 53 is placed in a channel groove in plate 17 to facilitate assembly. The hub 21 of the bearing is formed with a closed dome at 61 which may be forged from the stock of the end plate, or may be welded to the hub. The bearing sleeve 62 with the flange 63 may be provided as indicated, for the bearing stud 20.

Owing to the necessity for taking the grinder apart frequently for cleaning purposes, it is desirable that the gasket, if made of rubber, be suitably embedded in either of the clamping parts to hold its position as the parts are put together. If the gasket is made of soft metal, or the like, it can be placed in a V-groove without difficulty, as indicated in Fig. 1.

The invention may be applied in a variety of forms and is not to be understood as restricted to the form shown in the drawing.

Having thus described my invention, I claim:

1. A meat grinder comprising a hollow body, a feed screw rotatably mounted in said hollow body, a die plate for closing the end of said body having a central hub, a cutter engaging the face of said die plate and rotating with said feed screw, a bearing for said feed screw located in said hub, said bearing comprising a flanged sleeve fitted in said die plate with the flange flush with the face of said die plate, said sleeve having its outer end dome shaped to seal the bearing.

2. A meat grinder comprising a hollow body, a feed screw rotatably mounted in said hollow body, a die plate for closing the end of said body having a central hub, a cutter engaging the face of said die plate and rotating with said feed screw, a bearing for said feed screw, said bearing comprising a flanged sleeve located in said hub with the flange flush with the inner face of said die plate and a gasket placed between said flange and the die plate, said sleeve having its outer end dome shaped to seal the bearing.

3. A meat grinder comprising a hollow body, a feed screw rotatably mounted in said hollow body, a die plate for closing the end of said body having a central hub, a cutter engaging the face of said die plate and rotating with said feed screw, a cap with a gasket for securing said die plate to said body, a flanged bearing sleeve with a closed end for said feed screw located in said hub and a gasket placed between the flange of said bearing sleeve and said die plate.

CHARLES A. LAEMMEL.